(12) United States Patent
Bessho et al.

(10) Patent No.: US 8,942,239 B2
(45) Date of Patent: Jan. 27, 2015

(54) ROUTER AND METHOD OF SUPPLYING POWER TO MEMORY UNIT IN THE SAME

(71) Applicant: Sony Corporation, Tokyo (JP)

(72) Inventors: Kazuhiro Bessho, Kanagawa (JP); Masanori Hosomi, Tokyo (JP); Hiroyuki Ohmori, Kanagawa (JP); Yutaka Higo, Kanagawa (JP); Tetsuya Asayama, Tokyo (JP); Kazutaka Yamane, Kanagawa (JP); Hiroyuki Uchida, Kanagawa (JP)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 13/779,139

(22) Filed: Feb. 27, 2013

(65) Prior Publication Data

US 2013/0235872 A1    Sep. 12, 2013

(30) Foreign Application Priority Data

Mar. 6, 2012    (JP) ................................. 2012-048979

(51) Int. Cl.
| | |
|---|---|
| *H04L 12/28* | (2006.01) |
| *H04L 12/747* | (2013.01) |
| *H04L 12/773* | (2013.01) |
| *H04L 12/947* | (2013.01) |

(52) U.S. Cl.
CPC ............... *H04L 45/742* (2013.01); *H04L 49/25* (2013.01); *H04L 45/60* (2013.01)
USPC .......................................... 370/392; 370/318

(58) Field of Classification Search
CPC ........ H04L 45/60; H04L 45/742; H04L 49/25
USPC ..................... 370/318, 392; 455/127.1, 522
See application file for complete search history.

(56) References Cited

U.S. PATENT DOCUMENTS

| | | | | |
|---|---|---|---|---|
| 7,359,380 | B1 * | 4/2008 | Maufer et al. | 370/392 |
| 7,554,981 | B2 * | 6/2009 | Kecskemeti | 370/392 |
| 7,630,373 | B2 * | 12/2009 | Okuno | 370/392 |
| 2006/0056412 | A1 * | 3/2006 | Page | 370/392 |
| 2006/0123136 | A1 * | 6/2006 | Oku et al. | 709/250 |
| 2006/0253606 | A1 * | 11/2006 | Okuno | 709/238 |
| 2009/0103536 | A1 * | 4/2009 | Basso et al. | 370/392 |
| 2010/0246545 | A1 * | 9/2010 | Berzin | 370/338 |

OTHER PUBLICATIONS

Kobayashi et al. "Decision Tree Based Flow Search Hardware Engine Combined with Linear Search," The Institute of Electronics, Information, and Communication Engineers, IEICE Technical Report NS2010-203. (6 pages).

* cited by examiner

*Primary Examiner* — Afsar M Qureshi
(74) *Attorney, Agent, or Firm* — K&L Gates LLP

(57) ABSTRACT

A router, includes: a routing table memory unit configured to store a routing table and be capable of reading and writing the routing table at any time, the routing table being destination information of a packet; a search engine unit which has a transfer information base memory unit and which is configured to search for a destination of the packet based on a transfer information base; a power supply unit configured to supply power to the routing table memory unit and the transfer information base memory unit; and a control unit configured to control the power supply unit such that the power is supplied to the non-volatile memory when the non-volatile memory is operated, and the power supply is interrupted when the non-volatile memory is not operated.

6 Claims, 9 Drawing Sheets

ROUTER AND METHOD OF SUPPLYING POWER TO MEMORY UNIT IN THE SAME

CROSS REFERENCES TO RELATED APPLICATIONS

The present application claims priority to Japanese Priority Patent Application JP 2012-048979 filed in the Japan Patent Office on Mar. 6, 2012, the entire content of which is hereby incorporated by reference.

BACKGROUND

The present disclosure relates to a router using a non-volatile memory, for example, a spin torque-magnetic random access memory (ST-MRAM).

Along with a rapid spread of smart phones and tablet-type devices, an increase in network traffic is huge due to a delivery of large-volume contents including moving images. Meanwhile, a total power consumption of network equipment is also steeply increased. So, decreasing the power consumption is an urgent issue.

Among the network equipment, a router is considered to consume a lot of power. Specifically, a search engine for classifying packets is said to consume the most of the power in the router. An improvement in search processing becomes a key factor for decreasing the power consumption. In a packet classification process, the packets sent are classified using information including sender and receiver addresses and ports. Based on the classification, processing such as transfer to a specific destination, rejection and the like is performed. The classification is made by comparing and collating the information contained in the packets with the router set in advance in each processing.

For comparison and collation (or match retrieval), a device called as TCAM (Ternary Content Addressable Memory: associative memory) is often used. In the TCAM, data is compared in parallel in a round-robin system. It has an advantage of a high speed because all processing is done on hardware, but also has a disadvantage of an increase in the power consumption due to the parallel processing.

On the other hand, there is also a method of searching on software using a general memory by a tree search or a hash method. In this case, although the throughput is lower than that of the TCAM or the like for batch processing on the hardware, it is possible to significantly decrease the power consumption. The throughput can be improved by a method such as pipeline processing.

The processing made not by the device such as the TCAM but by an algorithm is expected for significantly lowering the power consumption of the search engine.

Along with a rapid development of various information apparatuses from mobile terminals to large capacity servers, further high performance improvements such as higher integration, increases in speed, and lower power consumption have been pursued in elements such as a memory element and a logic element configuring the apparatuses. Particularly, a semiconductor non-volatile memory has significantly progressed, and, as a large capacity file memory, a flash memory is spreading at such a rate that hard disk drives are replaced with the flash memory.

Meanwhile, the development of FeRAM (Ferroelectric Random Access Memory), MRAM (Magnetic Random Access Memory), PCRAM (Phase-Change Random Access Memory), or the like has progressed as a substitute for the current NOR flash memory, DRAM or the like in general use, in order to use them for code storage or as a working memory. A part of these is already in practical use.

Among them, the ST-MRAM performs the data storage using a magnetization direction of a magnetic material, so that high speed and nearly unlimited ($10^{15}$ times or more) rewriting can be made, and therefore has already been used in fields such as industrial automation and an airplane.

SUMMARY

In order to classify packets (determine a destination of the packets on a network), a memory apparatus for storing path information or the like that is compared with the packet information is necessary. As the memory apparatus, an SRAM or a DRAM is used depending on the application.

Battery driving equipment such as a mobile router is expected to further decrease the power consumption. These memory apparatuses such as the SRAM and the DRAM have the following problems with respect to the power consumption.

The SRAM has a problem that leakage current is increased, i.e., current is consumed at a non-operating time, along with the shrink of a design rule. In the DRAM, a refresh (rewriting) is necessary to be performed per a predetermined time, in order to avoid a loss of charges stored in a capacitor. In any case, a memory consumes power, for example, even if no search is conducted for a time period, during which traffic is low. It becomes a factor of inhibiting the power from decreasing.

It is desirable to provide a router that consumes the minimum power.

According to an embodiment of the present disclosure, a router includes:

a routing table memory unit in which a routing table is stored being capable of reading and writing at any time, the routing table being destination information of a packet;

a search engine unit having a transfer information base memory unit in which a transfer information base is stored being capable of reading and writing at any time, the transfer information base being created based on the routing table and being information of a correspondence relationship between a transferable destination of the packet and an appropriate destination for delivering the packet in a shortest path, the destination of the packet being searched based on the transfer information base, and at least one of the routing table memory unit and the transfer information base memory unit being a non-volatile memory;

a power supply unit for delivering power to the routing table memory unit and the transfer information base memory unit; and a control unit for controlling the power supply unit such that the power is supplied to the non-volatile memory when the non-volatile memory is operated, and the power is interrupted when the non-volatile memory is not operated.

At least one of the routing table memory unit and the information transfer table memory unit is a non-volatile memory. The control unit supplies the power to the non-volatile memory from the power supply unit when the non-volatile memory is operated, and interrupts the power when the non-volatile memory is not operated.

According to an embodiment of the present disclosure, a method of delivering power to a memory in a router including a search engine having a transfer information base memory unit and a routing table memory unit, at least one of the routing table memory unit and the information transfer table memory unit being a non-volatile memory, includes delivering the power to the non-volatile memory when the non-volatile memory is operated, and interrupts the power supply when the non-volatile memory is not operated.

In the router according to the embodiment of the present disclosure, a predetermined memory unit inside is non-volatile, the power is supplied when the memory unit is operated, and the power supply is interrupted when the memory is not operated, thereby decreasing the power consumption.

According to the embodiment of the present disclosure, the power supply is interrupted when the memory apparatus that stores a variety of reference information (the routing table and the transfer information base) does not have to perform an operation such as reading the information. Thus, power consumption by the memory apparatus can be zero.

In addition, since the memory apparatus used in the embodiment of the present disclosure is non-volatile, the information is held even if the power supply is interrupted. In other words, recovery is made quickly when the memory apparatus is operated again, and reconfiguration of the reference information is not necessary, which does not cause a delay.

Additional features and advantages are described herein, and will be apparent from the following Detailed Description and the figures.

DETAILED DESCRIPTION

Hereinafter, embodiments of the present disclosure will be described in the following order with reference to the drawings.
<1. Summary of ST-MRAM Used in Embodiments>
<2. Summary of Router Operation and Memory Apparatus Configuration According to Embodiments>
<3. First Embodiment>
<4. Second Embodiment>
<5. Third Embodiment>
<6. Fourth Embodiment>

1. Summary of ST-MRAM Used in Embodiments

First of all, the ST-MRAM (Spin Torque-Magnetic Random Access Memory), which is the memory apparatus used in the embodiments of the present disclosure, will be described. The ST-MRAM is also referred to as a spin torque MRAM.

Figure 8:
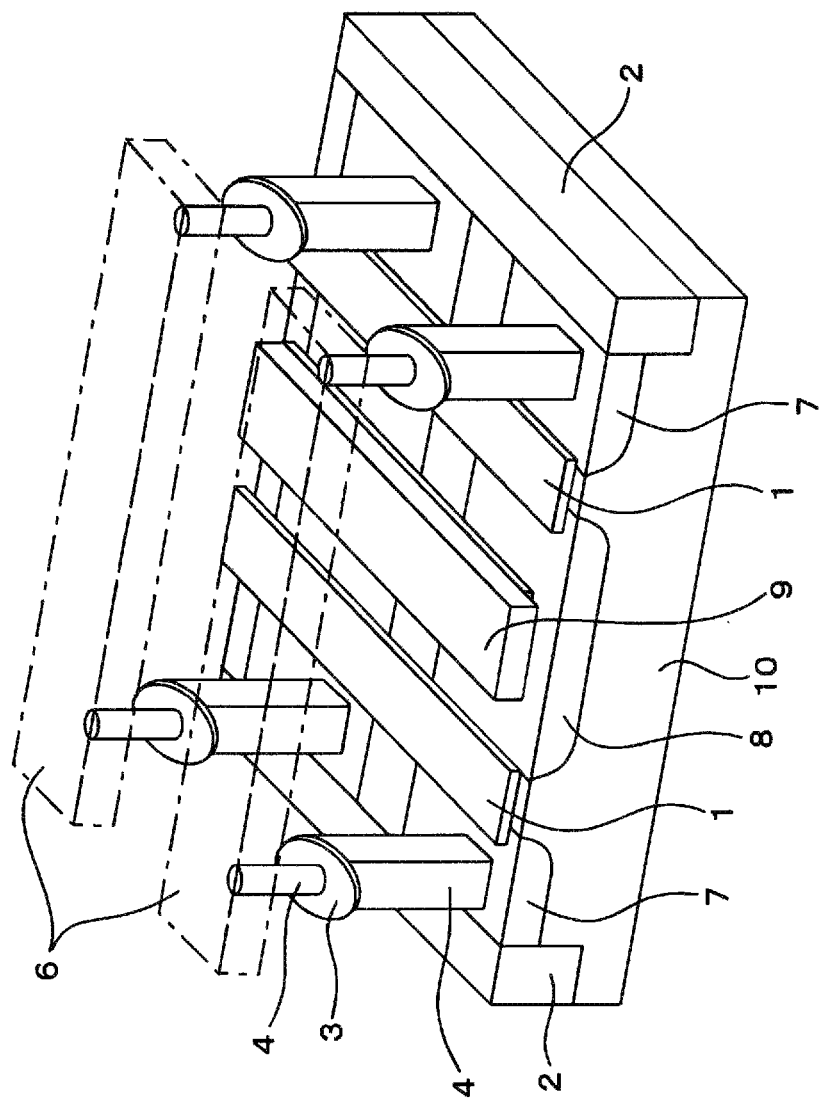
FIG. 8 is a schematic configuration diagram (perspective view) of a memory apparatus used in each embodiment of the present disclosure.
Figure 9:
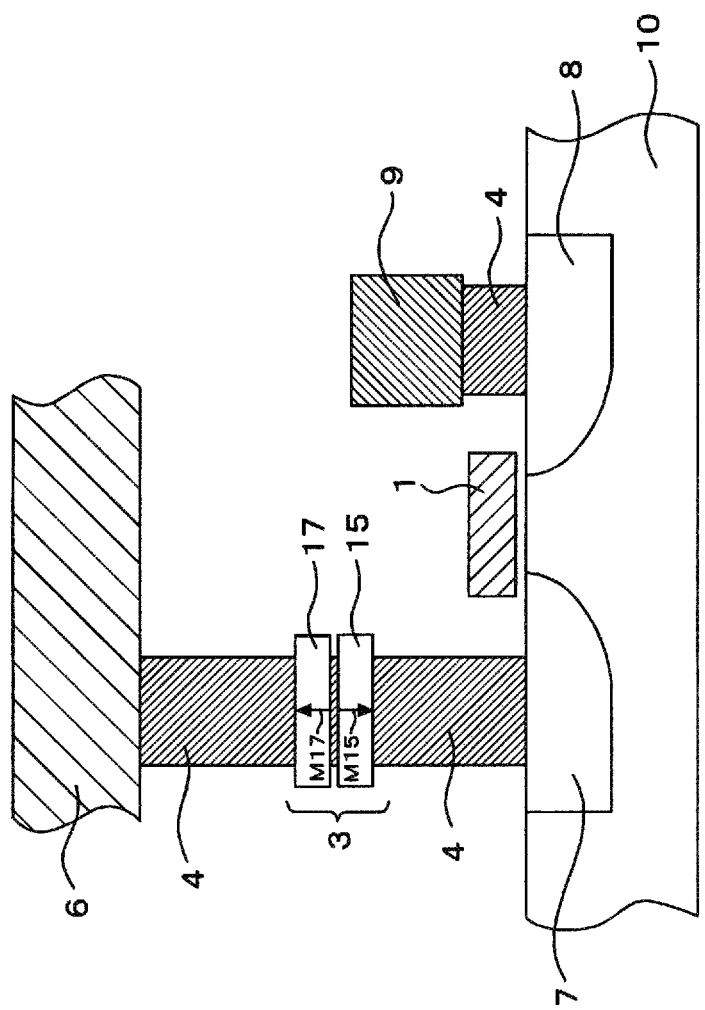
FIG. 9 is a cross-sectional view of the memory apparatus used in each embodiment of the present disclosure.

FIGS. 8 and 9 each show a schematic diagram of the ST-MRAM. FIG. 8 is a perspective view and FIG. 9 is a cross-sectional view.

As shown in FIG. 8, the ST-MRAM has the similar structure as the DRAM, and has the shape obtained by replacing the capacitor in the DRAM with a memory element 3. A part of the memory element 3 includes a transistor (MOS FET) for selecting the memory element 3.

The memory element 3 is disposed at an intersection of two address interconnections (for example, a word line and a bit line) that are perpendicular to each other.

A selection transistor for selecting the memory element 3 is formed on a part isolated by an element isolation layer 2 of a semiconductor base 10 such as a silicon substrate. The selection transistor includes a drain region 8, a source region 7, and a gate electrode 1. Among them, the gate electrode 1 functions also as an address interconnection (a word line) extending in the front-back direction in FIG. 8.

The drain region 8 is formed commonly with right and left selection transistors in FIG. 8, and an interconnection 9 is connected to the drain region 8.

The memory element 3 that switches a magnetization direction by a spin torque magnetization switching is disposed between the source region 7 and a bit line 6 that is disposed at an upper side and extends in the right-left direction in FIG. 8.

The memory element 3 is configured with, for example, an MTJ (Magnetic Tunnel Junction).

As shown in FIG. 9, the memory element 3 has two magnetic layers 15 and 17. In the two magnetic layers 15 and 17, one magnetic layer is set as a magnetization-fixed layer 15 in which the direction of a magnetization M15 is fixed, and the other magnetic layer is set as a magnetization-free layer in which the direction of a magnetization M17 varies, that is, a memory layer 17.

In addition, the memory element 3 is connected to the bit line 6 and the source region 7 through upper and lower contact layers 4, respectively.

In this manner, when current in the vertical direction is applied to the memory element 3 through the two types of address interconnections 1 and 6, the direction of the magnetization M17 of the memory layer 17 can be switched by a spin torque magnetization switching. (See Information and Communication Management, vol. 110, no. 448, NS2010-203, pp. 229-234 (2011) Physical Review B, 54, 9353 (1996)).

A phenomenon in which a resistance is high when directions of magnetization of two magnetic layers are opposite and a resistance is low when those are the same, which is called a TMR effect or a GMR effect, appears. Utilizing the high and low resistance values, the information is stored.

The ST-MRAM is a non-volatile memory in that the magnetization state is utilized for storing, and is characterized by the fact that the stored state is saved even after the power is turned off unlike the DRAM and the like.

Also, the ST-MRAM performs the data storage using a magnetization direction of a magnetic material, so that high speed and nearly unlimited ($10^{15}$ times or more) rewriting can be made. The high speed random accessibility (such as several nanoseconds) similar to that of the SRAM has already been attained.

2. Summary of Router Operation and Memory Apparatus Configuration According to Embodiments Next, a summary of a router operation and a memory apparatus configuration according to the embodiments of the present disclosure will be described referring to FIGS. 1 and 2.

Figure 1:
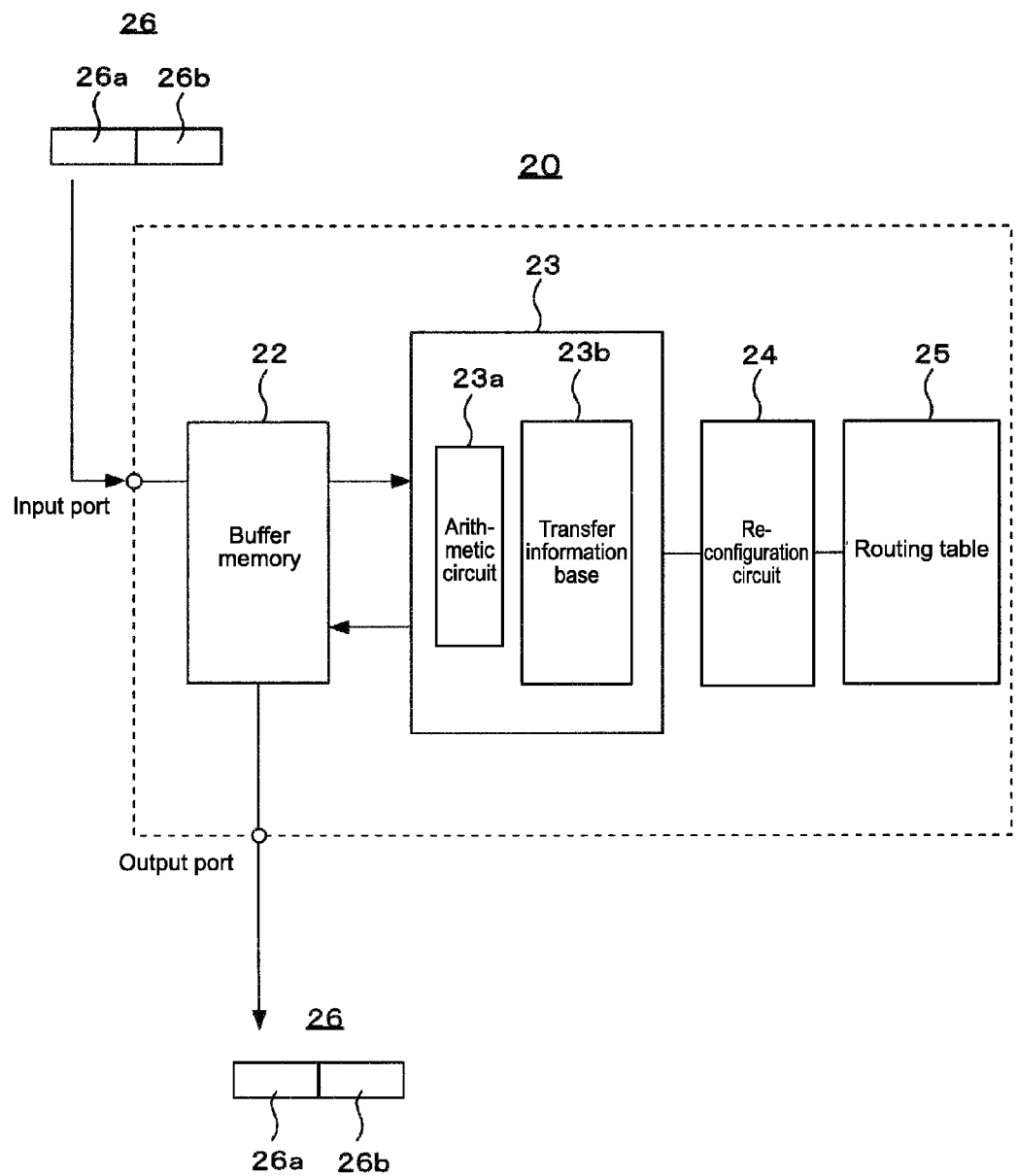
FIG. 1 shows a schematic flow of packet processing according to embodiments of the present disclosure.

FIG. 1 shows a simplified flow of transfer processing of a packet 26 in a router 20.

The packet 26 includes a header unit 26a and a data unit 26b, is input from an input port of the router 20, and is stored in a buffer memory 22.

The header unit 26a includes a destination IP address and the like, and only the header unit 26a is sent to a search engine 23.

In the search engine 23, an appropriate destination of the packet 26 is searched for.

A preliminary prepared transfer information base 23b stores a transferable destination and corresponding information about an output port that is an appropriate destination for delivering the packet 26 to the destination in a shortest path. By comparing the corresponding information with the destination information included in the header unit 26a of the packet 26, the output port is selected. The comparison is done in an arithmetic circuit 23a.

In FIG. 1, as a result of the search, the output port is selected. The header unit 26a is returned once to the buffer memory 22, and is combined with the data unit 26b. The packet 26 in an original form is sent to a next router or the like through the output port.

As to the search method by the search engine 23, there is a plurality of searching methods including a linear search method, a tree search method and a batch search method using a TCAM (Ternary Content Addressable Memory).

The linear search sequentially compares the IP address included in the header unit 26a with the address included in the transfer information base 23b. When the number of entries is increased, the number of trials is also increased in proportion to the number of the destination information managed by the router 20. Accordingly, in the router 20 that manages a large amount of the destination information, a large amount of time is necessary for searching.

In contrast, the tree search prepares a search tree structure that branches based on a destination information pattern as the transfer information base 23b, and searches in a shorter time than the linear search. In the tree search, by changing the search tree structure, the speed can be further increased.

In addition, the batch search is conducted on the transfer information base 23b using a special device, i.e., the TCAM, so that the high speed search is possible at one clock. However, when the TCAM is used, the power consumption may be increased, as described above.

In the embodiments of the present disclosure, as lower power consumption may be desirable, the second method, or the tree search method, is especially expected. In the tree search method, it is considered that the SRAM is mainly suitable as the memory apparatus used in the transfer information base 23b in order to satisfy the demand for the high speed operation.

As described above, there are shown three types of main search methods. These methods are the type of the search method in the search engine 23. Depending on these methods, the transfer information base 23b is adequately configured.

As shown in FIG. 1, the router 20 includes a routing table 25 that is a table for pure destination information in a general form, i.e., in a form not changed to fit the search. Path information in the routing table 25 is not fixed, and may be rewritten depending on the status, so as to reflect a detour instruction of the packet 26 when a new terminal is added or when a network error or the like is generated. This is also called as a dynamic routing. Based on the rewriting, the transfer information base 23b is also reconfigured. The reconfiguration is done by a reconfiguration circuit 24.

The DRAM may be suitable as the memory apparatus used in the routing table 25.

A general configuration of the hardware storing the destination information in the router 20, i.e., the memory apparatus in the router will be described referring to FIG. 2.

As described above, as the SRAM is suitable as the transfer information base and the DRAM is suitable as the routing table, an SRAM 14 and an DRAM 13 are simulated, respectively.

The transfer information base 23b is stored in the SRAM 14, and the routing table 25 is stored in the DRAM 13. The transfer information base (data) 23b is configured based on the routing table 25, as described above.

An OS (Operating System) (not shown) for controlling the operation of the router 20 is also stored in the DRAM 13.

Figure 2:
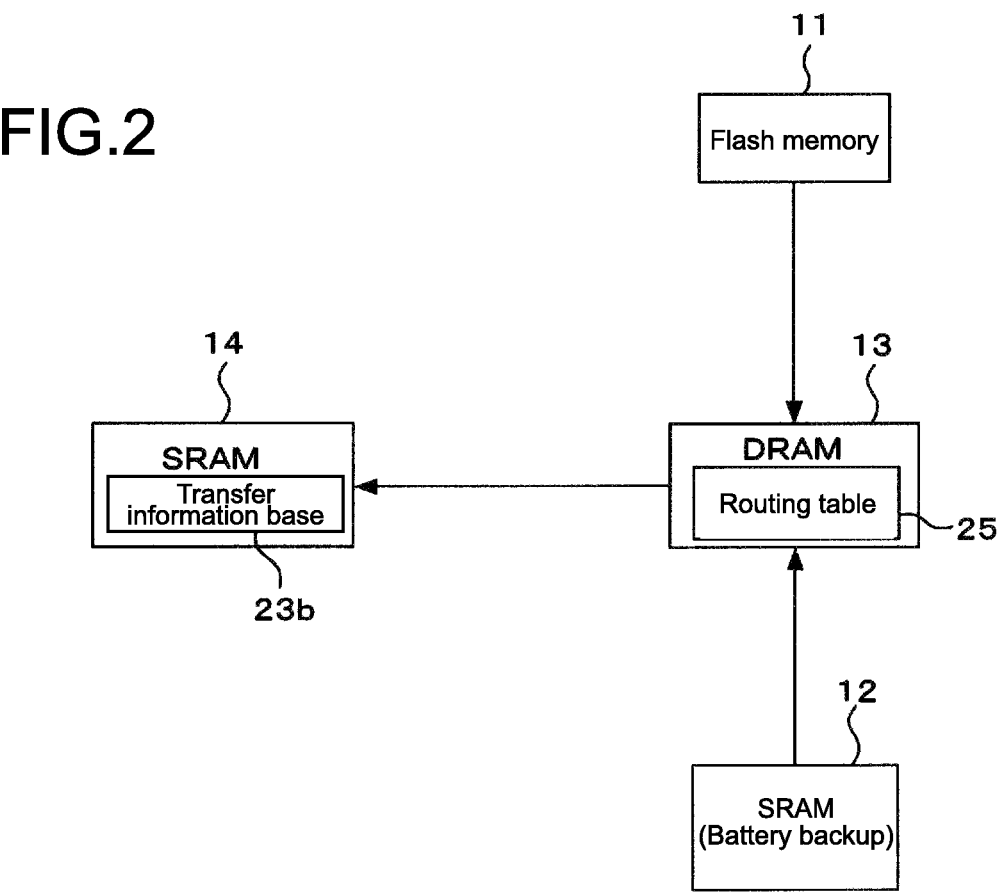
FIG. 2 is shows a schematic configuration of a memory (memory apparatus) according to the embodiments of the present disclosure.

On the other hand, as shown in FIG. 2, the router 20 includes so-called non-volatile memories such as a flash memory 11 and a battery backup SRAM 12 where no information is lost even after the power is turned off An OS for operating the router 20 is stored in the flash memory 11, and is copied to the DRAM 13 simultaneously with start-up (as soon as the power is turned on). Thereafter, the operation of the router 20 is controlled by the OS copied to the DRAM 13.

A configuration file including the routing table is stored in the battery backup SRAM 12, and is also copied to the DRAM 13 simultaneously with start-up.

Roles of the flash memory 11 and the battery backup SRAM 12 are to hold the information when the power is not supplied. Specifically, as described above, the information in the routing table 25 that may be rewritten for updating when, for example, the communication failure occurs, and the transfer information base 23b configured based on the routing table 25 are stored in the DRAM 13 and the SRAM 14, respectively. The information is lost as soon as the power is turned off because the DRAM 13 and the SRAM 14 are volatile memory apparatuses.

In general, since the power is supplied all the time, the loss of the information has not to be concerned.

However, when the power supply is interrupted for, for example, maintenance or the like, the routing table 25 is saved in the battery backup SRAM 12.

Alternatively, when the power supply is interrupted by power outage or the like, the information is read again from the flash memory 11 or the battery backup SRAM 12, and the OS and the routing table 25 are expanded on the DRAM 13.

So far, an overall configuration and an operation of the router 20 and a general configuration of the memory apparatus have been described according to the embodiment of the present disclosure. It is worthy of notice that a comparison between the packet information and the destination information that is managed by the router is made not by the routing table 25, but by the transfer information base 23b that is configured based on the contents of the routing table 25.

In other words, once the transfer information base 23b is configured, the routing table 25 itself is not basically referred to for searching.

Although, as an exceptional case, the routing table 25 is referred to when rewriting is made in a dynamic routing method, the frequency is significantly lower than that when the routing table 25 is referred to for searching.

The routing table 25 that rarely needs to be referred to is stored in the DRAM 13 that is a volatile memory.

A refresh operation is necessary for the DRAM 13. The power has to be continuously supplied to the DRAM 13, even if the routing table 25 is not referred to. Thus, unnecessary power will be consumed.

3. First Embodiment

Then, a first embodiment of the present disclosure will be described using FIG. 3.

A router 30 according to the first embodiment is different from the router shown in FIG. 2 in that the memory apparatus that stores the routing table 25 is changed from the DRAM 13 to an ST-MRAM 31.

The components already described are denoted by the same reference numerals, and thus detailed description thereof will be hereinafter omitted.

Figure 3:
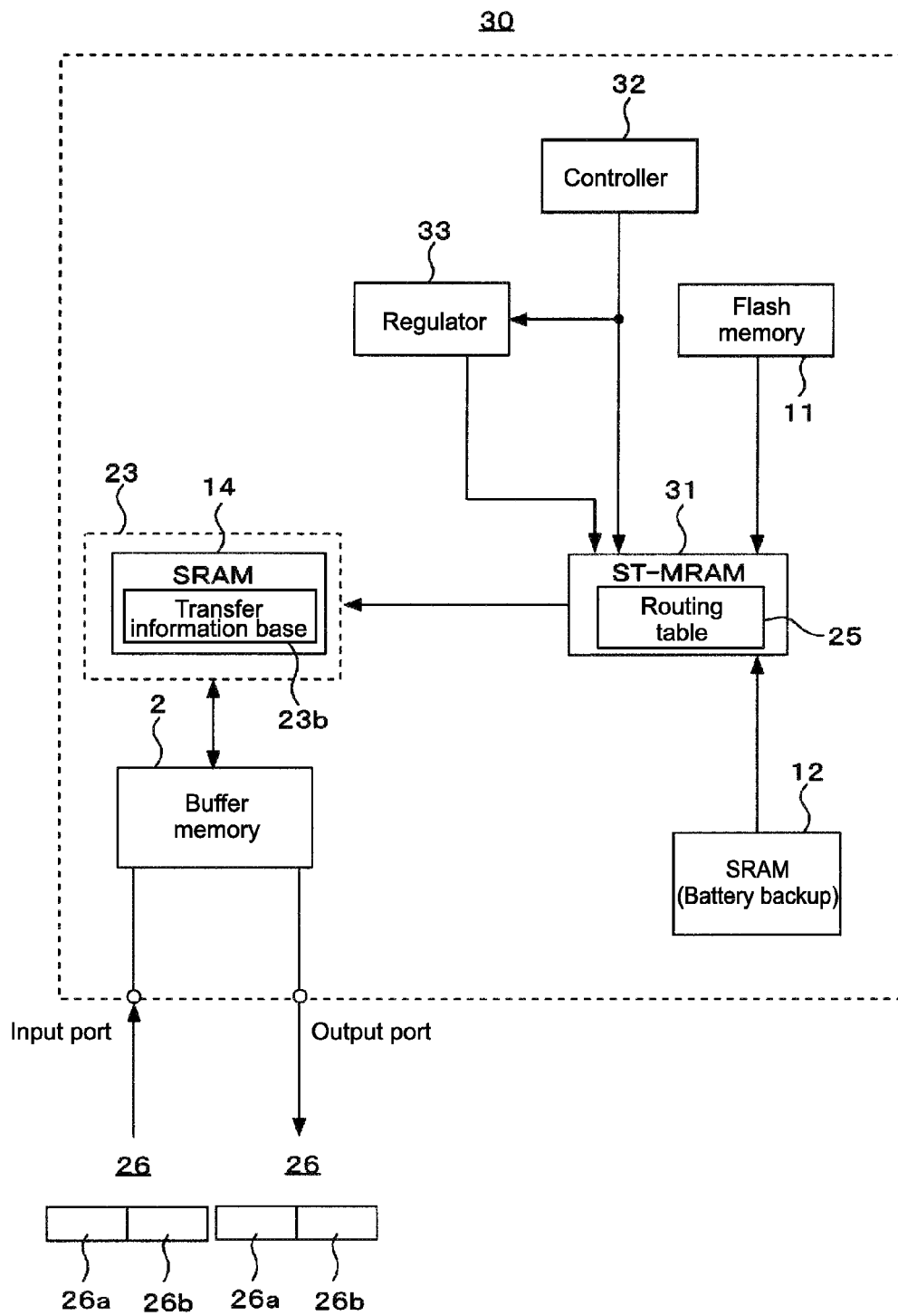
FIG. 3 shows a schematic configuration of a router according to a first embodiment of the present disclosure.

As shown in FIG. 3, the routing table 25 is stored in the ST-MRAM 31, and a regulator 33 is connected to the ST-MRAM 31 unlike the configuration in FIG. 2. Furthermore, a controller 32 is connected to the regulator 33.

The regulator 33 is for supplying power to the ST-MRAM 31. The controller 32 is for controlling the power supply to the regulator 33, reading and writing from/to the ST-MRAM 31, and the like.

As the ST-MRAM 31 is a non-volatile memory and has a high operation speed, power may be supplied to the ST-MRAM 31 only when necessary and the power supply can be interrupted at a non-operating time.

Since the refresh operation is necessary in the DRAM 13 shown in FIG. 2, it may be impossible to interrupt the power supply whether or not the DRAM 13 is referred to. Thus, the unnecessary power is consumed.

In the first embodiment, the routing table 25 is stored not in the DRAM 13, but in the ST-MRAM 31 that is the non-volatile memory apparatus capable of performing reading and writing operations at any time.

As the ST-MRAM 31 is the non-volatile memory, the power may be supplied to the ST-MRAM 31 (non-volatile random access memory) only at an operating time. Accordingly, by controlling the regulator 33 with the controller 32, it is possible to interrupt the power supply at the time when no rewriting or reading operation is performed, i.e., so-called at the non-operating time.

Specifically, the power may be supplied to the ST-MRAM 31 during the following operations: the expansion operation of the routing table 25 on the ST-MRAM 31 based on the OS and the configuration file being read from the flash memory 11 and the battery backup SRAM 12; the subsequent reference operation to the routing table 25 to create the transfer information base 23b; the re-expansion (writing) operation of the routing table 25 on the ST-MRAM 31 when updating (changing, adding or deleting) the path information in the dynamic routing is necessary; the subsequent re-reference operation to the routing table 25 to create the transfer information base 23b; and the write-back operation of the flash memory 11. Other than these (at the non-operating time), the power supply is not necessary.

Thus, power consumption that is necessary also at the non-operating time in the past can be zero. As the non-volatile memory holds the information even if the power supply is interrupted, there is no need to exchange the information with the battery backup SRAM when the power supply is interrupted or supplied again, and the operation of the router is not delayed.

As the non-volatile random access memory, a PCRAM (Phase Change Random Access Memory), an FeRAM (Ferroelectric RAM), an MRAM (Magnetoresistive RAM), an ReRAM (Resistance RAM) and the like can be used. Since nearly unlimited rewriting times, the operating speed and the power consumption that are comparable to those of the DRAM are necessary, the MRAM, in particular, a spin torque written MRAM (ST-MRAM) is desirably used.

It is conceivable that the power supply to the DRAM 13 is interrupted except when rewriting is made in the dynamic routing. However, as the DRAM 13 is volatile, the information such as the routing table 25 has to be saved in the battery backup SRAM 12 when the power supply is interrupted, and the saved information has to be copied to the DRAM 13 again upon rewriting. It generally takes microseconds to milliseconds. This is disadvantageous because it becomes a cause of a delay in the operation of the router that has to process the information at a rate of 10 gigabits or more per second.

When the router 20 is activated from the state that the router 20 is fully shut down, the OS and the configuration files are read from the flash memory 11 and the battery backup SRAM 12, respectively, as described above.

The routing information contained in the configuration file is expanded as the routing table 25 on the ST-MRAM 31, and the transfer information base 23b configured based on the routing table 25 is stored in the SRAM 14.

When the path information in the dynamic routing has to be updated, the power is supplied by the controller 32 and the regulator 33. The information before the power supply is interrupted, i.e., the information read from the flash memory 11 and the battery backup SRAM 12 upon the initial start-up is held in the ST-MRAM 31. Therefore, the information has not to be replicated again, and no delay is generated in the process.

4. Second Embodiment

Then, a router according to a second embodiment of the present disclosure will be described using FIG. 4.

A router 40 according to the second embodiment is different from the router in the first embodiment in that the memory apparatus that stores the transfer information base 23b is changed from the volatile memory SRAM 14 to a non-volatile memory ST-MRAM 42.

The components already described are denoted by the same reference numerals, and thus detailed description thereof will be hereinafter omitted.

Figure 4:
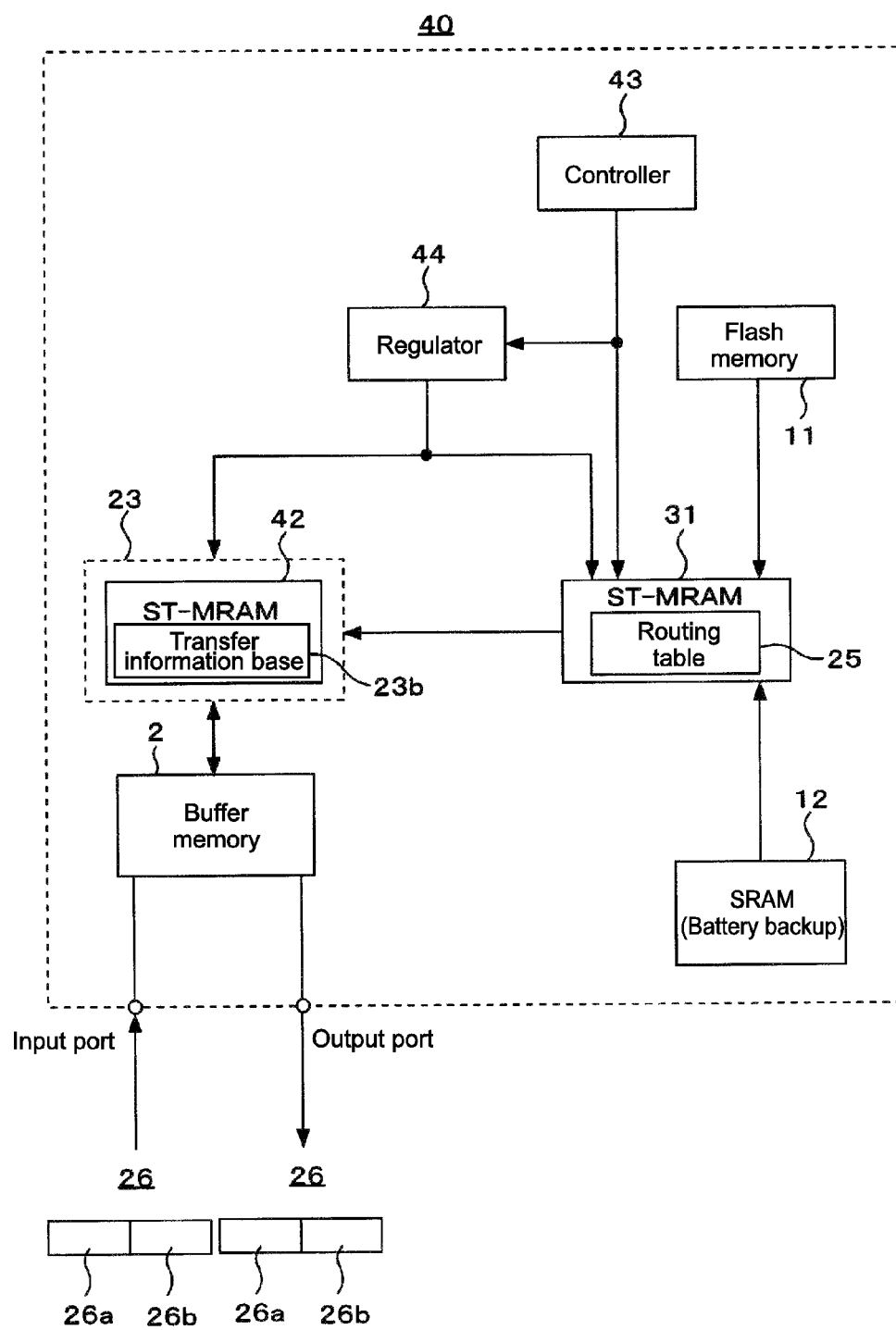
FIG. 4 shows a schematic configuration of a router according to a second embodiment of the present disclosure.

As shown in FIG. 4, the transfer information base 23b is stored in the ST-MRAM 42, and a regulator 44 is connected to the ST-MRAM 42 and the ST-MRAM 31. Furthermore, a controller 43 is connected to the regulator 44.

The regulator 44 is for supplying power to the ST-MRAM 42 and the ST-MRAM 31. The controller 43 is for controlling the power supply to the regulator 44, reading and writing operations of the ST-MRAM 31 and the ST-MRAM 42, and the like.

As the ST-MRAM 31 and the ST-MRAM 42 each are a non-volatile memory and have a high operation speed, power may be supplied to the ST-MRAM 31 and the ST-MRAM 42 only when necessary and can be interrupted at a non-operating time.

In the first embodiment, the memory apparatus in which the routing table 25 is stored is changed from the DRAM 13 to the ST-MRAM 31, whereby the power consumption can be decreased. In addition, the memory apparatus in which the transfer information base 23b is stored is changed from the SRAM 14 to the ST-MRAM 42, whereby the power supply is interrupted at the non-operating time and the power consumption can be further decreased.

As shown in FIG. 4, the transfer information base 23b is expanded on the ST-MRAM 42. As the ST-MRAM 42 is the non-volatile memory, the transfer information base 23b is not lost even if the power supply is interrupted.

Under the control by the controller 43, the power is supplied from the regulator 44 to the ST-MRAM 42. Thus, only when necessary, the power can be supplied to the ST-MRAM 42.

For example, it is possible to supply power to the ST-MRAM 42 and operate the ST-MRAM 42 only when the ST-MRAM 42 performs writing or reading operation.

In FIG. 2, the transfer information base 23b is stored in the SRAM 14. Since the SRAM 14 is a volatile memory, the power has to be supplied to the SRAM 14 all the time. By replacing the SRAM 14 with the non-volatile memory such as the ST-MRAM 42 as in the second embodiment, the power consumption can be decreased.

When the ST-MRAM 42 is replaced with the SRAM 14, the content in the SRAM 14 is lost upon power discontinuity. The transfer information base 23b has to be expanded again based on the routing table 25 at the time of start-up.

However, in the second embodiment, there is no need to expand the transfer information base 23b again. As the transfer information base 23b is already expanded on the ST-MRAM 42 at the time of start-up, no re-expansion is necessary except the first start-up and the operation speed can be increased as a whole.

5. Third Embodiment

Then, a third embodiment of the present disclosure will be described using FIG. 5.

In a router 50 according to the third embodiment, the SRAM used as the transfer information base is replaced with the ST-MRAM, and the ST-MRAM is divided into two that are disposed in parallel.

Thus, it is possible to switch the processing using only one ST-MRAM to the parallel processing using two ST-MRAMs depending on the packet amount to be processed. By interrupting the power supply to the ST-MRAM not used, it is possible to decrease the power consumption as a whole.

The components already described are denoted by the same reference numerals, and thus detailed description thereof will be hereinafter omitted.

Figure 5:
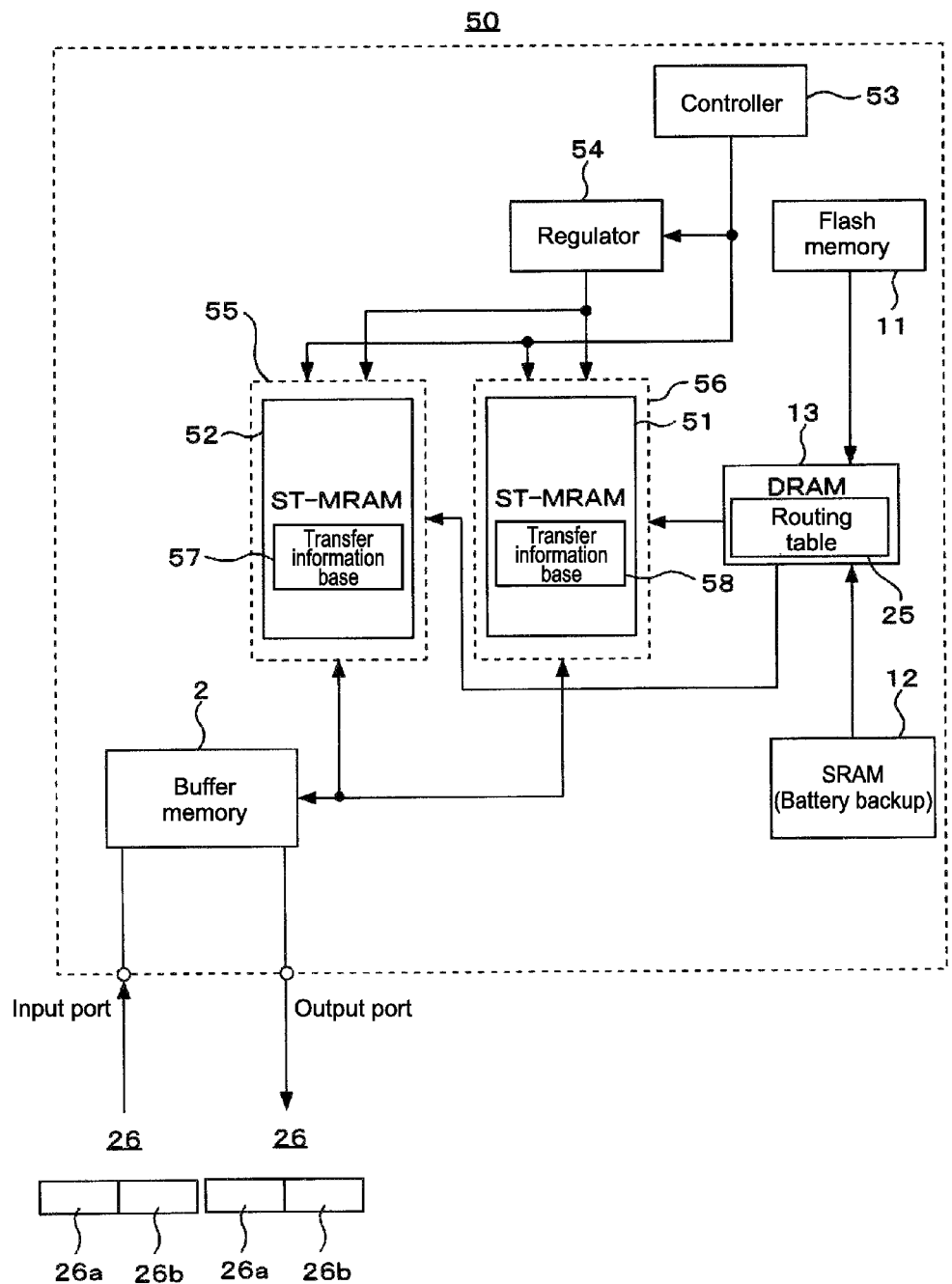
FIG. 5 shows a schematic configuration of a router according to a third embodiment of the present disclosure.

As shown in FIG. 5, a transfer information base 57 is stored in an ST-MRAM 52, and a transfer information base 58 is stored in an ST-MRAM 51. They configure two search engines 55 and 56. A regulator 54 is connected to the search engines 55 and 56. Furthermore, a controller 53 is connected to the regulator 54 and the search engines 55 and 56.

The regulator 54 is for supplying power to the ST-MRAM 52 of the search engine 55 and the ST-MRAM 51 of the search engine 56. The controller 53 is for controlling the power supply to the regulator 54, reading and writing operations of the ST-MRAM 52 of the search engine 55 and the ST-MRAM 51 of the search engine 56, and the like.

As the ST-MRAMs 51 and 52 each are a non-volatile memory and have a high operation speed, even if the power supply is interrupted at the non-operating time, the ST-MRAMs 51 and 52 can be operated by being supplied with the power again. Accordingly, the power may be supplied to the ST-MRAMs 51 and 52 and the ST-MRAMs 51 and 52 are operated only when necessary.

The transfer information base in the search engine operates for searching the destination all the time as long as the packet is being input. Therefore, even if the memory apparatus in which the transfer information base is stored is changed from the SRAM 14 to the ST-MRAM 42 as in the second embodiment, the power consumption of the memory apparatus at the search engine 23 side is not greatly decreased.

In contrast, in the third embodiment, by dividing the ST-MRAM into a plurality of search engines (two search engines 55 and 56 in FIG. 5) to dispose the search engines in parallel, when an amount of the packets to be processed is small (is decreased under a predetermined amount) with respect to packet flow, the packets are processed by only a part of the search engines (55 or 56), and the power supply to the remaining search engine(s) (56 or 55) is interrupted. Thus, the power can be supplied effectively to decrease the power supply.

The operation will be described briefly below.

When the router 50 is activated from the state that the router 50 is fully shut down, the OS and the configuration files are read from the flash memory 11 and the battery backup SRAM 12, respectively, to the DRAM 13, as already described.

The path information contained in the configuration file is expanded as the routing table 25 on the DRAM 13. The transfer information base 57 and the transfer information base 58 are configured based on the routing table 25. The transfer information base 57 is stored in the ST-MRAM 52 and the transfer information base 58 is stored in the ST-MRAM 51.

The ST-MRAMs 52 and 51 configure the search engines 55 and 56, respectively.

It is assumed that the router 50 in the third embodiment can process the packets at the rate of 10 gigabits per second at most.

Depending on the time period, for example, the router 50 receives the packets at 5 gigabits or less per second. In this case, either of the search engines 55 or 56, for example, only the search engine 55 is operated, and all the packets are sent to the search engine 55, thereby providing a sufficient processing speed. At this time, the power supply to the search engine 56 can be interrupted using the controller 53 and the regulator 54 to avoid unnecessary power consumption by the search engine 56.

On the other hand, when receiving the packets at more than 5 gigabits and up to 10 gigabits per second, both of the search engines 55 and 56 are operated, and the packets are distributed such that loads of both search engines become same.

Figure 6:
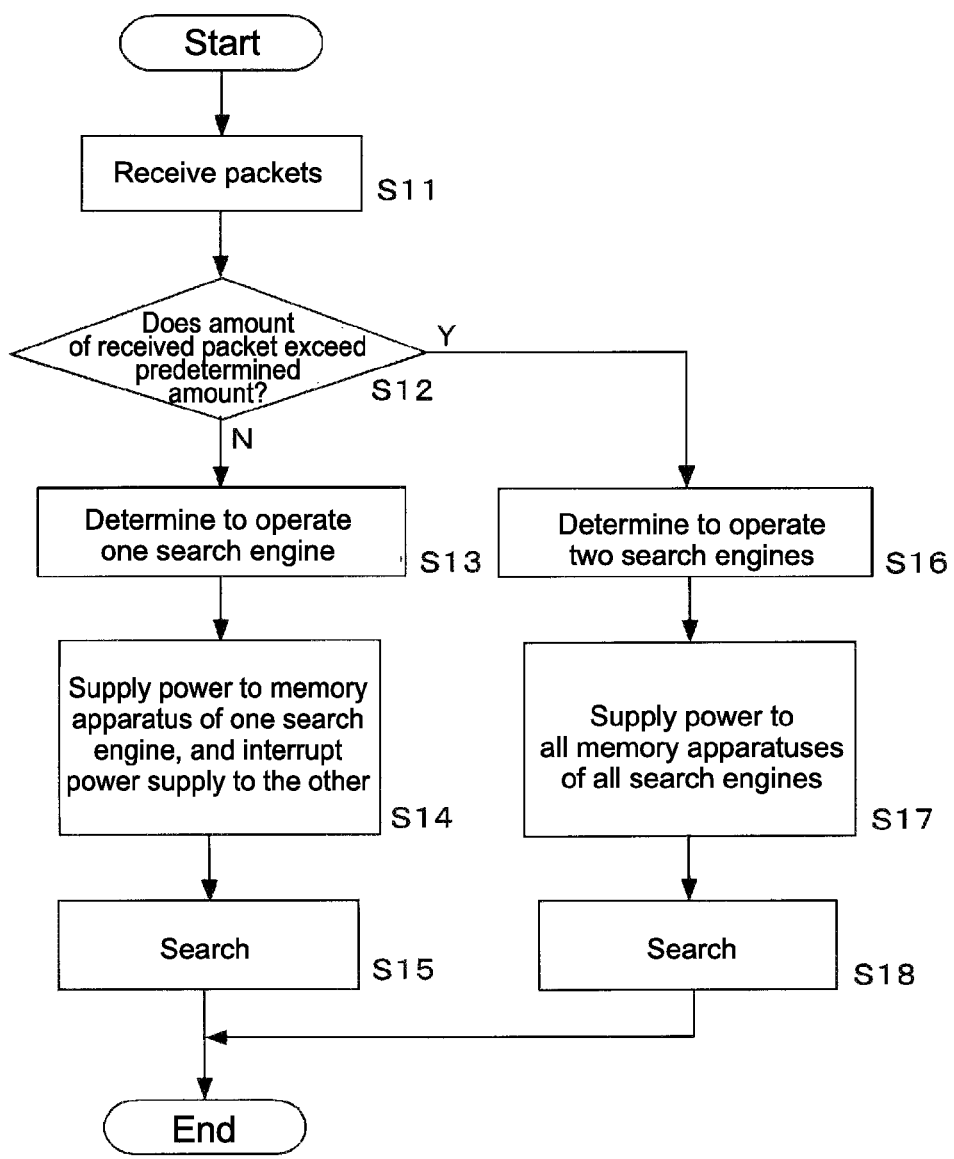
FIG. 6 is a flow chart of search processing according to the third embodiment of the present disclosure.

A process flow for the packets transmitted to the router 50 in the search engines 55 and 56 will be briefly described referring to FIG. 6. The process shown in FIG. 6 is controlled by the controller 53.

In step S11, the router 50 receives the packets.

In step S12, whether or not the amount of the received packets is a predetermined amount is determined When the amount does not exceed the predetermined amount, the process proceeds to step S13. When the amount exceeds the predetermined amount, the process proceeds to step S16.

In step S13, it is determined that only one of the search engines (55 or 56) is operated.

In step S14, the power is supplied to the search engine (55 or 56) that is determined to be operated in S13, and the power supply to the other search engine (56 or 55) is interrupted.

In step S15, a search is performed by the search engine (55 or 56) that is supplied with power in S14.

The above description is a process flow in the case that the amount of the packets does not exceed the predetermined amount.

In step S16, when the amount of the packets exceeds the predetermined amount by the determination in step S12, it is determined that the two search engines 55 and 56 are operated.

In step S17, the power is supplied to the two search engines 55 and 56 that are determined to be operated in S16.

In step S18, a search is performed by the search engines 55 and 56 that are supplied with power in step S17.

Steps S16 to S18 are a process flow in the case that the amount of the packets exceeds the predetermined amount.

If the search engine 56 uses the SRAM instead of the ST-MRAM 51, the interruption of the power supply is not desirable. This is because the SRAM is a volatile memory. Once the power supply is interrupted, the transfer information base is lost. When the amount of the packets again reaches 10 gigabits per second and the router 50 is re-started, it takes a lot of time to exchange the information with the routing table 25, leading to a delay in the operation of the router 50.

In other words, by using the non-volatile ST-MRAM 51 in the search engine 56, it becomes possible for the first time to interrupt the power supply at the non-operating time.

According to the third embodiment, the ST-MRAM is divided into two search engines, and one of the two search engines is stopped when the amount of the packets is ½ or less of the maximum throughput.

In general, when the ST-MRAM is divided into N (N is 2 or more) search engines and the amount of the packets is K/N (K is an integer of 1 or more to less than N) or less, (N–K) search engines can be stopped to avoid the unnecessary power consumption. K search engine can be operated to continue the process.

However, if the number of the search engines is increased more than necessary, the number of the chips is increased to enlarge the size of the apparatus. So, a user (or designer) may select the number of the search engines.

Also, the number of the search engines to be stopped may be selected such that an overall performance of the router 50 including the power consumption and a response speed of the controller 53 and the regulator 54 is satisfactory and is optimum for the user (designer) or the like, depending on the time dependency of the predicted amount of the packets. For example, it is not always necessary to stop a part of the search engines when the amount of the packets is lower than the predetermined amount for a quite short time period.

6. Fourth Embodiment

Then, a fourth embodiment of the present disclosure will be described using FIG. 7.

A router 60 according to the fourth embodiment is different from the router in the third embodiment in that the memory apparatus in which the routing table 25 is stored is changed from the DRAM 13 to the ST-MRAM 31. The replacement is similar to that in the first embodiment.

In the fourth embodiment, the memory apparatus used as the transfer information base is divided into the ST-MRAM 52 and the ST-MRAM 51, and the above-mentioned replacement is performed. Thus, it is possible to further decrease the power consumption.

The components already described are denoted by the same reference numerals, and thus detailed description thereof will be hereinafter omitted.

Figure 7:
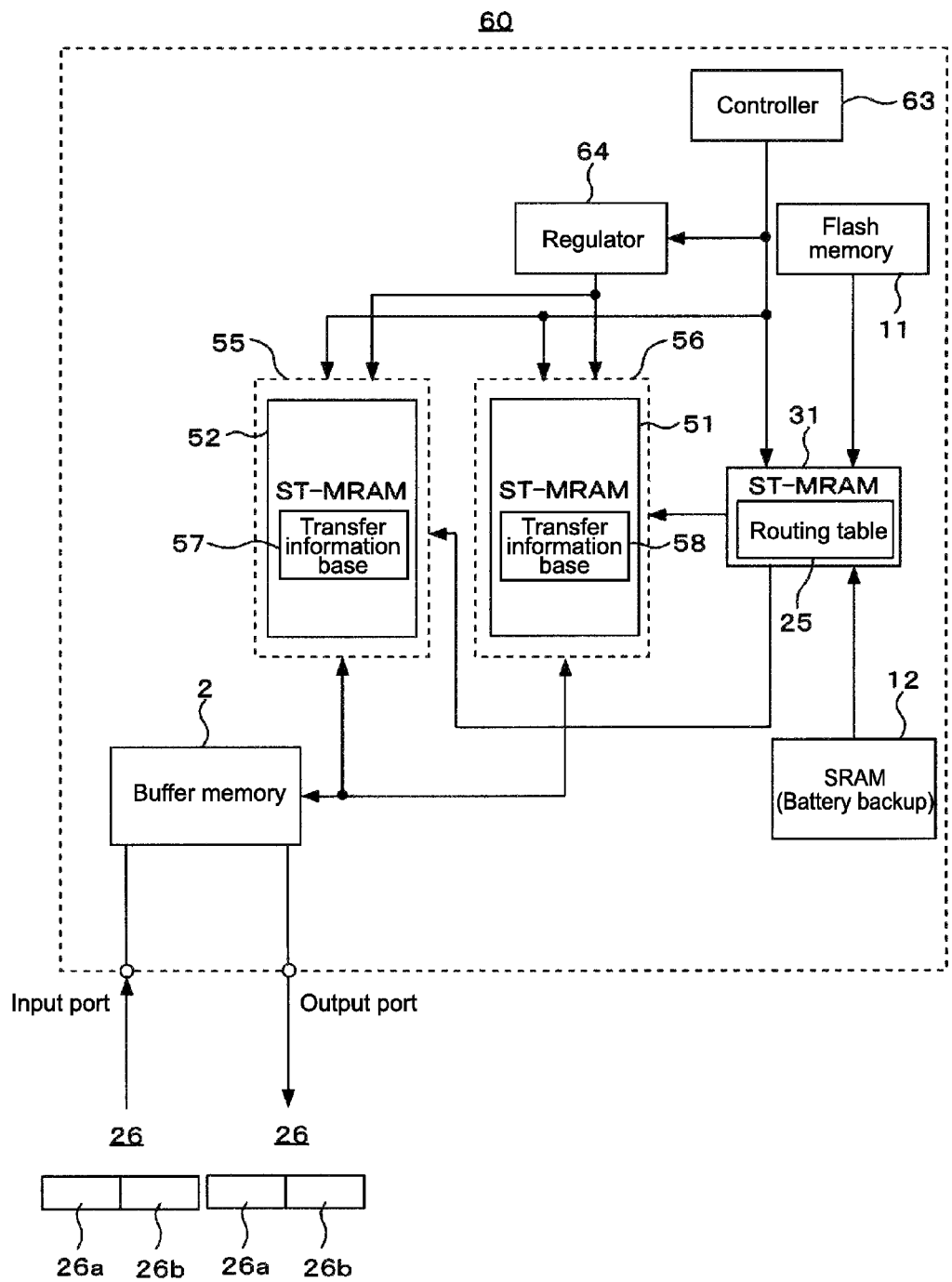
FIG. 7 shows a schematic configuration of a router according to a fourth embodiment of the present disclosure.

As shown in FIG. 7, the routing table 25 is stored in the ST-MRAM 31. The transfer information base 57 is stored in the ST-MRAM 52, and the transfer information base 58 is stored in the ST-MRAM 51. They configure the search engines 55 and 56. A regulator 64 is connected to the search engines 55 and 56 and the ST-MRAM 31. Furthermore, a controller 63 is connected to the regulator 64, the search engines 55 and 56, and the ST-MRAM 31.

The regulator 64 is for supplying power to the ST-MRAM 31, the ST-MRAM 52 of the search engine 55 and the ST-MRAM 51 of the search engine 56. The controller 63 is for controlling the power supply to the regulator 64, reading and writing operations of the ST-MRAM 52 and the ST-MRAM 51, and the like.

The controller 63 controls the ST-MRAM 51 and the ST-MRAM 52 similarly as shown in FIG. 6.

As the ST-MRAM 31 and the ST-MRAMs 51 and 52 each are a non-volatile memory and have a high operation speed, even if the power supply is interrupted at the non-operating time, the ST-MRAM 31 and the ST-MRAMs 51 and 52 can be operated by being supplied with the power again. Accordingly, the power may be supplied to the ST-MRAM 31 and the ST-MRAMs 51 and 52 and the ST-MRAM 31 and the ST-MRAMs 51 and 52 are operated only when necessary.

Such a router 60 can further decrease the power consumption.

The present disclosure may have the following configurations.

(1) A router, including:
a routing table memory unit configured to store a routing table and be capable of reading and writing the routing table at any time, the routing table being destination information of a packet;
a search engine unit which has a transfer information base memory unit and which is configured to search for a destination of the packet based on a transfer information base, the transfer information base memory unit storing the transfer information base and being capable of reading and writing the transfer information base at any time, the transfer information base being created based on the routing table and being information of a correspondence relationship between a transferable destination of the packet and an appropriate destination for delivering the packet in a shortest path, at least one of the routing table memory unit and the transfer information base memory unit being a non-volatile memory;
a power supply unit configured to supply power to the routing table memory unit and the transfer information base memory unit; and
a control unit configured to control the power supply unit such that the power is supplied to the non-volatile memory when the non-volatile memory is operated, and the power supply is interrupted when the non-volatile memory is not operated.

(2) The router according to (1) above, in which
the routing table memory unit is a non-volatile memory.

(3) The router according to (1) above, in which
the information transfer table memory unit is a non-volatile memory.

(4) The router according to (1) above, in which
the routing table memory unit and the information transfer table memory unit each are a non-volatile memory.

(5) The router according to (1) to (4) above, in which
the non-volatile memory is a spin torque MRAM.

(6) The router according to (1) to (5) above, in which
the search engine unit is divided into a plurality of search engines, each search engine having the transfer information base memory unit in which the transfer information base is stored, and processing the packet in parallel,
the control unit determines, depending on the amount of the packet, which of the plurality of search engines is to be operated, controls the power supply unit, supplies the power to the transfer information base memory unit in the search engine to be operated, and interrupts the power supply to each transfer information base memory unit in the remaining search engines.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A router, comprising:
a routing table memory unit configured to store a routing table and be capable of reading and writing the routing table at any time, the routing table being destination information of a packet;
a search engine unit which has a transfer information base memory unit and which is configured to search for a destination of the packet based on a transfer information base, the transfer information base memory unit storing the transfer information base and being capable of reading and writing the transfer information base at any time, the transfer information base being created based on the routing table and being information of a correspondence relationship between a transferable destination of the packet and an appropriate destination for delivering the packet in a shortest path, at least one of the routing table memory unit and the transfer information base memory unit being a non-volatile memory;
a power supply unit configured to supply power to the routing table memory unit and the transfer information base memory unit; and
a control unit configured to control the power supply unit such that the power is supplied to the non-volatile memory when the non-volatile memory is operated, and the power supply is interrupted when the non-volatile memory is not operated.

2. The router according to claim 1, wherein
the routing table memory unit is a non-volatile memory.

3. The router according to claim 1, wherein
the information transfer table memory unit is a non-volatile memory.

4. The router according to claim 3, wherein
the search engine unit is divided into a plurality of search engines, each search engine having the transfer information base memory unit in which the transfer information base is stored, and processing the packet in parallel,
the control unit determines, depending on the amount of the packet, which of the plurality of search engines is to be operated, controls the power supply unit, supplies the power to the transfer information base memory unit in the search engine to be operated, and interrupts the power supply to each transfer information base memory unit in the remaining search engines.

5. The router according to claim 1, wherein
the routing table memory unit and the information transfer table memory unit each are a non-volatile memory.

6. The router according to claim 1, wherein
the non-volatile memory is a spin torque MRAM.

* * * * *